FILM-POSITIONING SYSTEM

Original Filed Nov. 17, 1969 2 Sheets-Sheet 1

INVENTOR.
WALTER RENOLD
BY
PASTORIZA & KELLY
Attorneys

FILM-POSITIONING SYSTEM

Original Filed Nov. 17, 1969 2 Sheets-Sheet 2

INVENTOR.
WALTER RENOLD
BY PASTORIZA & KELLY
Attorneys

United States Patent Office

Re. 28,046
Reissued June 18, 1974

28,046
FILM-POSITIONING SYSTEM

Walter Renold, North Hollywood, Calif., assignor to Seaco Computer-Display Incorporated, Garland, Tex.

Original No. 3,591,282, dated July 6, 1971, Ser. No. 877,376, Nov. 17, 1969. Application for reissue Sept. 5, 1972, Ser. No. 286,195
Int. Cl. G03b *27/46, 27/58*
U.S. Cl. 355—54 18 Claims

Matter enclosed in heavy brackets [ ] appears in the original patent but forms no part of this reissue specification; matter printed in italics indicates the additions made by reissue.

ABSTRACT OF THE DISCLOSURE

A film-positioning system is provided for enabling rapid sequential exposure or readout of film framelets making up a microfiche film frame. Successive framelets are exposed or read out in standard industry step and repeat sequence by moving the microfiche film frame relative to a fixed lens in successive incremental steps without having to move major portions of the apparatus. This is accomplished in part by providing first and second storage loops adjacent to opposite ends of the exposure area to accommodate the movement of the film in exposing or reading out a row of framelets. Other bulky apparatus such as the payout and takeup microfiche film reels need not be incrementally moved when exposing rows but only when shifting to a new row all to the end that exposure of microfiche film framelets or, alternatively, location of a single framelet for readout can more rapidly be effected than possible with equipment provided heretofore.

This invention relates to a film-positioning system and more particularly to a microfiche-type film frame-positioning system for enabling rapid sequential exposure or readout of microfiche film framelets from a given microfiche film frame.

BACKGROUND OF THE INVENTION

The term "microfiche" is widely used by those skilled in the camera art as defining a card-shaped piece of film of about 4 x 6 inches in size containing a plurality of small images arranged in rows. Unperforated film of 105 mm. width is normally used. This wide-type film is hereafter referred to as microfiche film and in some instances may be supplied tn rolls wound on enlarged reels in the same manner as conventional motion picture film and thereafter cut to provide individual microfiche frames, or initially supplied in precut condition.

Such microfiche film is used for recording data and has many of the same applications as other microfilm forms. In microfiche film data storage, successive large frames hereinafter referred to as "microfiche frames" serve to store data by successively exposing small portions of the overall microfiche frame, such small portions hereinafter being referred to as "framelets." Thus, rows of framlets, each framelet, for example, perhaps representing a page of written material, are provided on the microfiche frame so that a single microfiche frame itself will include perhaps 50 to 100 or more framelets and thus represent data storage corresponding to 50 to 100 or more pages.

The size of the microfiche frames made up of the individual framlets are convenient for storage in card index-type files and permit rapid location of stored data of the type consisting of reports, magazines, and shorter treatises any one of which can normally be accommodated on a single microfiche frame.

While the foregoing microfiche film data storage system is very useful for certain types of data such as described, the actual exposure of a microfiche film frame to provide the various rows of framelets involves certain difficulties. More particularly, in large volume production of microfiche, 100 foot rolls of film are normally used in place of precut film. The use of rolls of film has heretofore required the entire camera mechanism to move in both axes. Thus, incremental or steplike movements between successive exposures must be effected in the longitudinal axis to provide the rows of framelets and incremental steps must be effected in a transverse axis when moving from one exposed row to a new row for subsequent exposure of the framelets. Moreover, at the end of each row the mechanism must be returned for the start of the next row, and similarly it must be returned at the end of the motion in the other axis. Hence, the term "step and repeat cameras" is employed for such apparatus. The mechanism for effecting such movements is large and bulky and the operative speed is relatively low. Some of these time consuming reset motions can be avoided by exposing the framelets in a zigzag pattern, that is, expose successive rows in opposite sequence. But microfiche with the framelets arranged in such nonstandard pattern must be rearranged to be useful in a majority of existing readout devices. Such rearranging could involve more costly and time consuming operations, and therefore such schemes and their variations which produce microfiche in nonstandard arrangement of frames are very undesirable.

In order to overcome the problem of inertia and large bulky apparatus for moving the camera, other schemes have contemplated using a translating lens. However, such systems would require very expensive optical equipment to reduce undesirable off-axis distortions.

It is often important to be able to record on microfilm data provided from computer output. This data is normally displayed on the face of a cathode-ray tube and is considerably smaller than a printed page which might normally be photographed in a conventional operation. It is possible accordingly to use a smaller and more compact camera when recording computer output, but when microfiche is to be produced with conventional equipment requiring motion in two axes, reduction in size is difficult. Further, the data from the cathode ray tube to be recorded can appear in rapid sequence and when an entire camera mechanism must be incrementally shifted along two axes to record the successive images appearing on the tube, equipment presently available is simply not capable of keeping up with the rapid output from the computers.

BRIEF DESCRIPTION OF THE PRESENT INVENTION

With the foregoing in mind, the present invention contemplates a novel film-positioning system which will enable successive framelets in a microfiche film frame to be exposed in standard sequence without the necessity of moving the entire mechanism in two axes all to the end that bulky equipment heretofore required can be substantially eliminated with the attendant advantage of higher speed in recording data.

More particularly, in accord with the present invention, rather than moving the entire film-supporting mechanism with respect to the camera lens, only a portion of the film itself including the particular microfiche portion to be exposed is moved. Since this portion of film is relatively light, it may be very rapidly incrementally shifted in position to effect the desired successive exposures. This movement is accommodated by providing first and second storage loops of the microfiche film so that as the film portion itself is moved, one of the storage loops decreases in size and the other storage loop increases in size. To return the film for the start of the next row, said portion of film can be very rapidly moved back, while the storage loops change in size, in opposite sense. By this arrangement, the payout microfiche film reel and takeup microfiche film reel can remain motionless during the entire operation of exposing the framelets making up a microfiche film frame.

To commence a next row of framelet exposure, it is again possible only to shift a portion of the film in a transverse direction, the storage loops being capable of accommodating such shifting. However, it may be easier to simply shift the entire mechanism in the transverse direction the incremental distance involved. Normally, the problems of speed or inertia involved when shifting in the transverse direction are of small consequence since such steps are effected within the length of time it takes to retrace an entire row on the longitudinal axis. Further, these transverse movements will occur only during a small percentage of the operating time. For example, if the microfiche film frame includes longitudinal rows of 12 framelets each, there being only provided for example, five such rows, in the overall exposure of the 60 frames, there only need take place five incremental movements of the entire mechanism as opposed to 60 such movements heretofore required.

BRIEF DESCRIPTION OF THE DRAWINGS

A better understanding of the invention will be had by referring to the accompanying drawings, in which.

DETAILED DESCRIPTION OF THE EMBODIMENT OF FIG. 1

Figure 1:
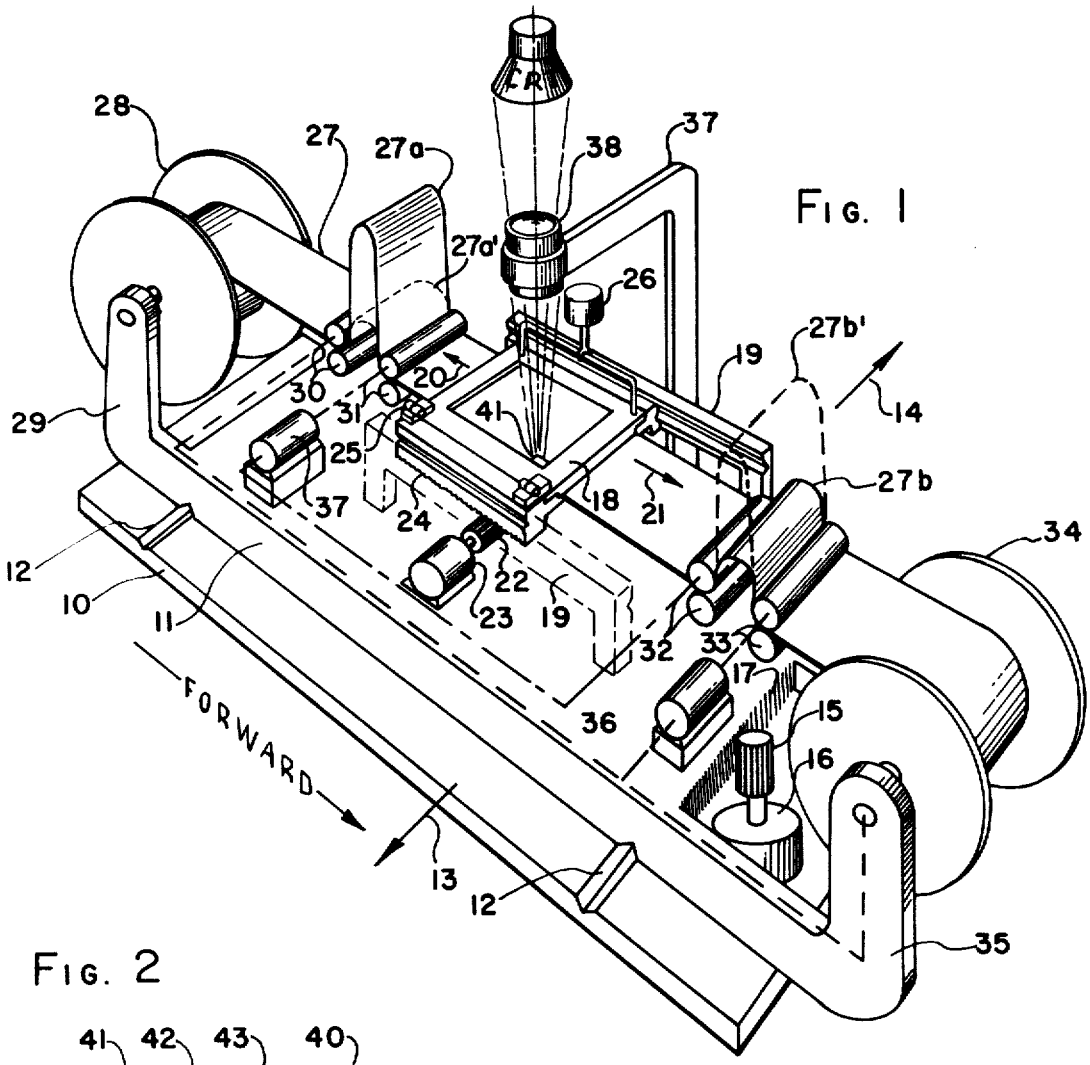
FIG. 1 is a highly schematic perspective view of an apparatus for positioning microfiche film in accord with a first embodiment of the present invention.

Referring to FIG. 1, there is shown a stationary base 10 mounting a table 11 for transverse movement along suitable ball bearings (not shown) in tracks 12 as indicated by the arrows 13 and 14. This transverse movement is effected in incremental steps by a first drive means which, for illustrative purposes, has been depicted as a pinion gear 15 driven by a motor 16 cooperating with a transverse rack 17 as shown.

A film gate 18, in turn, is slidably mounted in tracks 19 carried by the table 11. By this arrangement, the film gate can move longitudinally relative to the table as indicated by the arrows 20 and 21. The front track 19 is shown in phantom lines to avoid obscuring other portions of the drawing. This movement is also effected in incremental steps by a second drive means which may include a pinion 22 driven by a motor 23 cooperating with a longitudinal rack 24 on the film gate 18 as shown. The gate 18 includes hinges 25 so that film in the gate may be clamped or unclamped by a suitable actuator coupled to the gate as shown at 26.

Microfiche film 27 is shown positioned in the gate 18. This film is supplied from a payout reel 28 mounted to the table 11 as by arm 29. Between the payout reel 28 and the entrance portion of the film gate 18, there is provided a first film loop forming means comprised of rollers 30 and 31 for forming a film loop of a first given film size as indicated at 27a. A second film loop forming means comprised of rollers 32 and 33, in turn, receives film from the exit portion of the gate 18 and forms a film loop of a second given film size as indicated at 27b. From the second film forming means, the film 27 passes to a takeup reel 34 mounted to the table 11 as by arm 35. The rollers are mounted on the table 11 by any suitable means (not shown). All rollers are shown in pairs of which one may be driven as a capstan while the other is a nondriven pressure roller keeping the film in friction contact with its associated capstan roller. A motor 36 is shown for driving the rollers 30 and 33 and a motor 37 for driving the rollers 31 and 32.

A fixed lens 38 supported rigidly as by arm 39 on the base 10 is shown disposed over the film gate 13 for projecting an image from a cathode-ray tube CRT onto a portion of the microfiche film frame in the gate 18. The image on the cathode-ray tube displays the output from a computer which when photographed at reduced scale is converted into a computer output microfilm often referred to in the art as C.O.M.

From the description thus far, it will be evident that the film gate 18 and film frame area defined thereby may be moved together as by the pinion 22 and motor 23 in the direction of the arrows 20 and 21. This movement can take place without any corresponding movement of the payout reel 28 and takeup reel 34 since the storage loops of film 27a and 27b are sufficient in size to accommodate the movement over the overall length of the film frame. Thus, when the gate and film are moved in the direction of the arrow 21 by the drive motor 23 and with rollers 31 and 32 being driven in synchronism with the gate by motor 37, the first film loop 27a will decrease in size and simultaneously, the second film loop 27b will increase in size. These size changes are depicted respectively by the dotted line showing 27a' and 27b'. In order, however, to move an entirely new microfiche film frame into the gate 18, and still maintain the desired relative film loop sizes, it is necessary to drive the rollers 30 constituting part of the first film loop forming means and also drive rollers 33 constituting part of the second film loop forming means as by drive motor 36 which motor is also arranged to drive the takeup reel 34 all as depicted by the dashed lines.

Figure 2:
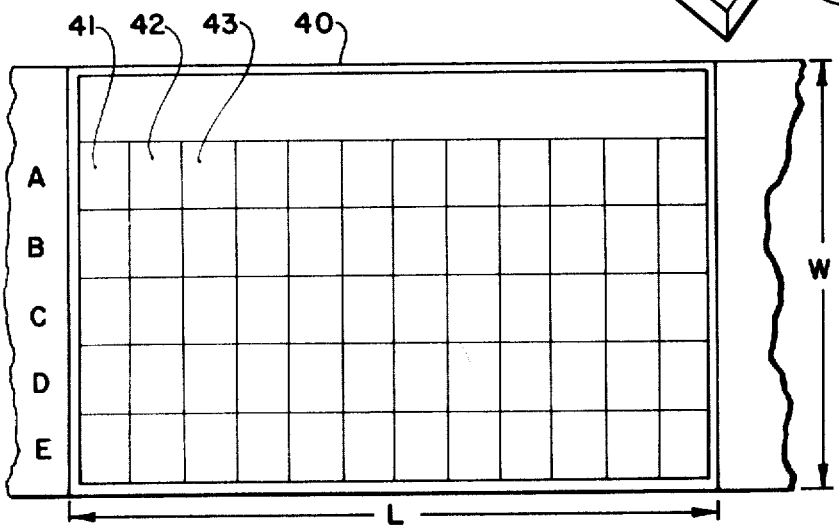
FIG. 2 is an enlarged fragmentary plan view of a portion of the microfiche film of FIG. 1 illustrating a typical exposure pattern of the film framelets making up an overall microfiche film frame as might be provided by the apparatus of FIG. 1.

FIG. 2 illustrates a portion of the microfiche film 27 wherein a microfiche film frame designated generally by the arrow 40 is shown as including a series of rows designated A, B, C, D, and E of individual framelets such as the framelets 41, 42, 43, etc. for the row A.

In FIG. 2, the overall length of the microfiche film frame is designated L and the overall width as W. In the particular example chosen for illustrative purposes, there are typically provided five rows as described each comprising 12 framelets to provide a total of 60 framelets on the single microfiche film frame with allowance for title and border areas. Thus, if a magazine of 60 pages or a report or treatise of a corresponding number of pages were to be recorded, the same could be accommodated on the single microfiche film frame, each framelet serving to record one page. The overall frame may be cut and stored in the manner of cards in a card index file for easy retrieval and ultimate reproduction or viewing.

OPERATION OF THE EMBODIMENT OF FIG. 1

With reference again to FIG. 1, film is pulled from the payout reel 28 by the first film loop-forming means, the rollers 30 driving the film in a forward direction as indicated with rollers 31 stationary to form a first given loop size 27a as shown. This loop size stores a sufficient length of film to define at least one length of an overall microfiche film frame; that is, at least the length corresponding to L in FIG. 2 is stored by the loop 27a. Also, the rollers 33 of the second loop-forming means are driven in a forward direction to reduce the loop 27b' to the small size 27b, while rollers 32 are stationary and takeup reel 34 is driven to wind up the film passed on to it by rollers 33. At the end of this movement, the second film loop size 27b may be minimal or not even exist. However, it is preferable to provide a small amount of storage in order to avoid undue tension in the film. The same considerations apply also to the first loop when it is at its small size 27a'.

During the foregoing initial operations of the first and second film loop-forming means, the gate 18 with the film clamped and microfiche film frame defined by the gate area are positioned as shown in FIG. 1 wherein they are closest to the first film loop-forming means so that the lens will project an image adjacent to the upper left corner of the gate 18 when viewed from the rear of the apparatus in FIG. 1. Also, the table 11 is positioned such that the image from the lens 36 falls on the top row of the film when viewed as described. In this position, the first framelet to be exposed would be that depicted by the numeral 41 as shown in both FIGS. 1 and 2.

This film framelet may then be exposed and immediately thereafter, the film within the gate along with the gate 18 moved an incremental distance in the direction of the arrow 21 by the drive motors 23 and 37. The next framelet in the first row corresponding to the framelet 42 in FIG. 2 is then exposed. This process is repeated until a complete row of framelets has been successively exposed. During this exposure, and as described heretofore, the first film loop size 27a will decrease and the second film loop size 27b will increase. There is no necessity for movement of any other mechanism in the apparatus and thus an extremely rapid sequence of exposures for the framelets in the row can be achieved.

After exposure of the first row, the drive means in the form of the motors 23 and 37 will return the gate 18 and film respectively, to their initial positions by moving them back in the direction of the arrow 20 so that the loop 27a again becomes large and the loop 27b small. During this latter movement, the entire table 11 is moved transversely in the direction of the arrow 13 by the drive means 15, 16 and 17 so that the next succesive row such as row B in FIG. 2 is positioned with its initial framelet beneath the lens 38. The longitudinal incremental stepping movement of just the film gate and film itself is then effected as before to expose a film row of microfiche framelets.

The foregoing process is completed until all five rows have been properly exposed at which time, the table 11 is transversely returned in the direction of the arrow 14 to its initial position. At this stage, the gate is positioned close to the rollers 32, the first loop is in its small size 27a', and the second loop in its larger size 27b'. The gate is now unclamped from the film by actuator 26 and driven in the direction of the arrow 20 to its position close to rollers 31, without affecting the film position. Thereafter, or during this latter movement of the gate, the aforedescribed initial actions of the first and second loop forming means are repeated. Thus, rollers 30 pull another fiche-length of film from supply reel 28, and enlarge the first loop to its size 27a, while rollers 33 are reducing the second loop by the same length of film to its size 27b. The film payed out by rollers 33 is wound up by takeup reel 34. Finally, the actuator 26 clamps the film in the gate and the component parts are then in positions to permit exposure of a new microfiche film frame.

It will thus be evident the only time the entire mechanism must be shifted is to change from one row to the next and thus for an exposure of a total of 60 framelets, only five such incremental shifts must be made. Therefore, inertia problems and precision registration problems associated with a rapid movement of the entire mechanism are substantially reduced. On the other hand, the successive exposure of 12 framelets in a longitudinal direction can be effected extremely rapidly since the inertia of the film gate and film itself between the storage loops is relatively small.

DETAILED DESCRIPTION OF THE EMBODIMENT OF FIG. 3

Figure 3:
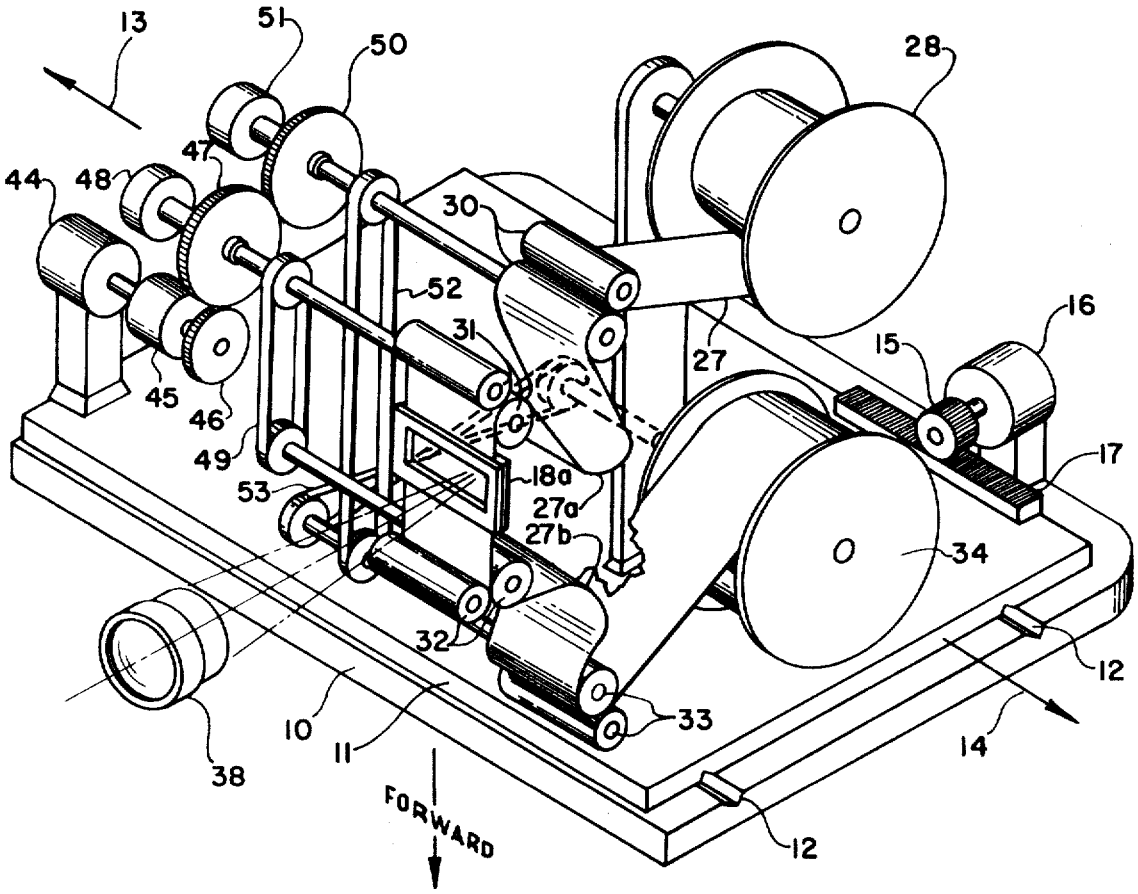
FIG. 3 is a schematic perspective view of a second embodiment of the invention.

Referring now to FIG. 3, there is shown a second embodiment of the invention wherein most of the features of the first embodiment of FIG. 1 are provided, except that a stationary film gate is used and consequently the functions germane to the moving film gate are omitted. Elements common to both the embodiments are identified with the same numerals in FIGS. 1 and 3.

As shown in FIG. 3, the film 27 passes from the payout reel 28 past rollers 30 and is formed into the loop 27a. The film then passes through rollers 31 and through a fixed film gate 18a, whence it passes between rollers 32, forms loop 27b, and is finally wound about the takeup reel 34. A servomotor 44 is connected to a potentiometer 45, and through gears 46 and 47 to the input of a clutch 48. The output of clutch 48 is connected to the driven roller 31, and by means of the belt 49 to the driven roller 32. Gears 47 and 50 connect the motor drive to the input of clutch 51 which input, however, is turning in the opposite direction to the input of clutch 48 because of the action of the gears. The output of clutch 51 connects to the driven roller 30, then through another belt drive 52 to the driven roller 33, and through still another belt drive 53 to takeup reel 34, as shown. Each clutch has a brake which permits locking the disengaged output to the frame of the mechanism.

In this embodiment, the structural support and the drive of the mechanism in transverse directions are similar to that shown in FIG. 1, and designated by the same numerals 10, 11, 15, 16 and 17 and movement arrows 13 and 14. The greater compactness due to the narrow fixed film gate makes it advantageous to place the mechanism in an upright position. The lengths of the shafts are greatly exaggerated to clarify the illustration.

The foregoing arrangement provides one common motor drive for all the functions taking place on the moving table. Further, the motor 44 may be a servomotor for the drive. Such a system can easily be programmed to accurately produce any desired size for the framelets step increments, and it does not generate the vibrations and film slippage that may be caused by so-called stepping motors often employed in similar applications. With smooth acceleration and deceleration the servo drive may accomplish the return motion of the film in one fast step. Such a servo drive requires a feedback position-sensing means and this is provided by the potentiometer 45, which must be reset or turned back periodically to its first position.

OPERATION OF THE EMBODIMENT OF FIG. 3

In operation and with the film loops formed as shown, the clutch 51 is disengaged and clutch 48 is engaged. Rollers 31 and 32 are then driven forward in incremental steps with the gate at all times stationary, until a whole row of framelets has been exposed. Next, the rollers are driven back to position the film for exposure of the next row. Because of the narrow film gate, portions of the film comprising the microfiche frame are moved in and out of the loops. The incremental drive for the transverse axis is moved in the same sequence as in the embodiment of FIG. 1.

After the last row of framelets has been exposed, the film is in a forward position. One extra forward step is now taken to align the centerline of the first framelet in the next fiche frame with the lens. Clutch 48 is disengaged, and clutch 51 is engaged to rollers 30 and 33. As the motor 44 turns backward, the potentiometer 45 or other angular position-sensing means is also turned back, while the rollers 30 and 33 are moved in a forward direction as is required. Consequently no separate time period is needed to reset said position-sensing means.

The advantages of the moving film gate as described in FIG. 1 such as holding the whole microfiche film frame clamped flat during its entire exposure, which aids optical alignment and reduces the possibility of film scratches, are lost in the embodiment of FIG. 3. However, other advantages are gained in the embodiment of FIG. 3, such as further considerable reduction in space requirements. If the film is driven by rollers 31 and 32, and the film gate is stationary, the length of the gate has to accommodate only one column of framelets. This narrow gate requires much less space than the large microfiche frame-size gage in the other embodiment, which must be allowed further space for its movements.

The elimination of some portions of the mechanism helps to reduce cost, and the lower inertial loads permit further increase in operational speed. Therefore, in some applications, these considerations may outweigh the advantages of the moving film gate.

Referring back to the embodiment of FIG. 1, a common drive motor could replace any two or all three of the motors 23, 36, and 37 with suitable clutches connecting the common motor to drive the gate and/or rollers in the desired manner. Further, it should be noted that the drive motor 37 of the rollers 31 and 32 could be omitted so that these rollers are freely rotatable. In this instance, the desired film movement would be effected totally by the gate drive and clamping of the film by the gate. To maintain the loop sizes, reliance would be had on the natural stiffness of the film or suitable film guides could be used.

Conversely, the film gate drive motor 23 could be omitted and the drive motor 37 for the rollers 31 and 32 used solely to move the film and gate when clamped to the film. This latter modification however, would require an additional film movement to return the gate at the end of a complete microfische film frame exposure as well as additional clamping and unclamping operations.

In the event servomotor drives are used in the embodiment of FIG. 1, feedback devices such as the potentiometer as described in the embodiment of FIG. 3 would be required. When the servo drive is used, it is possible with suitable cltuching arrangement to avoid the extra return period required to reset the potentiometer at the end of a microfiche exposure so long as a drive means is provided for the gate. In other words, the potentiometer is reset simultaneously with return movement of the gate.

While the invention has been described primarily with the exposure of microfiche film framelets from a computer output, it will be evident that the principles are equally as well applicable to production of microfiche by direct photography as well as to a rapid location of a particular microfishe frame and framelet in a roll of exposed microfiche film for readout purposes. The term "exposure" as used herein is meant to encompass the concept of exposing a film framelet area for the photographing of data thereon as well as exposing a film framelet for readout purposes.

What I claim is:

1. A film-positioning system for enabling rapid sequential exposure of film framelets arranged in a longitudinal row substantially defining the beginning and end of a larger film frame on film provided from a payout reel of film fed to a takeup reel, comprising, in combination:

a. means defining an exposure area through which said film passes;

b. fixed exposure means positioned to expose said film in a given portion of said area corresponding to the area of each framelet;

c. first loop-forming means positioned between said payout reel and said exposure area for forming a loop in said film of a first given loop size;

d. second loop-forming means positioned between said takeup reel and said exposure area for forming another loop in said film of a second given loop size; and e. drive means for incrementally moving said film from said first loop-forming means to said second loop-forming means to thereby decrease said first loop size and simultaneously increase said second loop size so that said successive exposures may be made without any paying out or taking up of film by said payout and takeup reels, respectively.

2. A system according to claim 1, in which means are provided to incrementally move the mechanism including said means defining an exposure area, first and second loop-forming means, and payout and takeup reels, in a transverse direction, whereby a plurality of rows of framelets may be successively exposed.

3. A system according to claim 1, in which said means defining an exposure area comprises a film gate, and means for moving said film gate transversely in incremental steps relative to said fixed exposure means whereby a plurality of rows of framelets may be successively exposed.

4. A system according to claim 1, in which said means defining an exposure area comprises a film gate, said drive means being coupled to said film gate to move said film gate and large film frame defined by said gate together in the longitudinal direction of said film.

5. A system according to claim 4, including means for moving said film gate transversely in incremental steps relative to said fixed exposure means whereby a plurality of rows of framelets may be successively exposed.

6. A system according to claim 1, in which said larger film frame includes additional longitudinal rows of framelets, said drive means for incrementally moving said film being reversible to return the film from said second loop-forming means to said first loop-forming means, preparatory to exposing an additional longitudinal row; and means to incrementally position the adjacent longitudinal rows in line with said fixed exposure means, whereby a plurality of rows of framelets may be successively exposed.

7. A microfiche film-positioning system for enabling rapid sequential exposure of film framelets arranged in rows to define a larger microfiche film frame, the length of each row substantially defining the length of said microfiche film frame and the number of rows in side-by-side relationship defining substantially the width of said microfiche film frame, whereby successive microfiche film frames from a roll of microfiche film on a payout reel fed to a takeup reel, are provided for subsequent exposure of framelets, comprising, in combination:

a. a base;

b. a table mounted to said base for transverse movement, said table supporting said payout and takeup reels;

c. a film gate mounted to said table, microfiche film from said payout reel passing through said gate to said takeup reel, said gate defining an exposure area for at least a portion of a microfiche film frame;

d. a lens fixed relative to said base in a position to expose a given portion of said microfiche frame corresponding to one framelet in area;

e. a first film loop-forming means mounted on said table for forming a first film loop of a first given loop size in a portion of said film between said payout reel and its entrance into said film gate;

f. a second film loop-forming means mounted on said table for forming a second film loop of a second given loop size in a portion of said film between its exit from said film gate and said takeup reel;

g. first drive means on said base coupled to said table for moving said table, payout reel, takeup reel, film gate, and said first and second film loop-forming means in transverse directions given successive incremental distances each defined by the width of a framelet and;

h. second drive means on said table for moving said film relative to said table in longitudinal directions given successive incremental distances each defined by a length of a framelet, said first given loop size being sufficient to store a length of film at least equal to the length of one microfiche film frame, whereby operation of said second drive means successively moves said microfiche film in longitudinal positions for successive exposures of said framelets making up a row, without any movement of said table and payout and takeup reels, said first film loop size decreasing and said second film loop size increasing to accommodate the movement, said second drive means then returning said film to its initial position to thereby increase said first film loop size and decrease said second film loop size to their original sizes, said first drive means then moving said table transversely one incremental distance so that a second row of framelets may be successively exposed, the process being repeated until all framelets on said microfiche frame are exposed, said second drive means then causing said first and second film loop-forming means and said payout and takeup reels to move in cooperation to pay out and take up a microfiche film frame length to thereby position at least a portion of a next microfiche film frame in said gate for successive exposures.

8. A microfiche film-positioning system according to claim 7, in which said film gate is mounted for longitudinal movement to said table, said gate having means for clamping and unclamping the film, and said gate accommodating a film frame the size of one microfiche, said second drive means on the table for moving said film relative to said table in longitudinal directions including means to drive the moving film gate, which when clamping the film will then move the film with it.

9. A microfiche film-positioning system according to claim 7, in which said film gate is mounted for longitudinal movement to said table, said gate having means for clamping and unclamping the film, and said gate accommodating a film frame the size of one microfiche, such that when said moving film gate is clamped to the film, said second drive means for moving said film relative to said table in longitudinal directions, will cause the film gate to be pulled along by the moving film.

10. A microfiche film-positioning system according to claim 7, in which said first and second film loop forming means include drive roller means, said second drive means including a servo drive having a position-sensing means and clutch means connected to said drive roller means all cooperating together such that when said second drive means causes said cooperating means to position at least a portion of a next microfiche film frame in said gate for successive exposures, said position-sensing means is reset.

*11. Computer output microfilm apparatus, comprising:*

*cathode ray tube means for displaying successive images on a face thereof, the images being representative of data received at the output of computer means,*

*fixed lens means for projecting said images onto a defined portion of microfilm disposed at an exposure station for the photographing of said data upon said defined microfilm portion,*

*payout and take up reel means for respectively paying out of unexposed microfilm to, and taking up of exposed microfilm from, said exposure station,*

*means for providing first and second loops in said microfilm for effectively isolating the movement of said defined microfilm portion from the movement of said payout and take up reels, said first loop being disposed between said payout reel means and said exposure station, said second loop being disposed between said takeup reel means and said exposure station, and*

*drive means for incrementally moving said defined portion of said microfilm with respect to said fixed lens without any paying out or taking up of microfilm by said payout and take up reels, thereby to photographically expose said successively displayed images on discrete areas of said defined microfilm portion.*

*12. Film positioning apparatus for enabling rapid exposure of selected framelets on a defined portion of film provided from a payout reel to a take up reel, comprising:*

*(a) fixed exposure means positioned to expose said defined portion of film at an exposure station,*

*(b) first and second means for isolating the movement of said defined portion of film from the paying out or taking up of film by said payout and take up reels during said movement, and*

*(c) first drive means for incrementally moving said defined portion of film with respect to said fixed exposure means without any paying out or taking up of film by said payout and take up reels, thereby to position said selected framelets for exposure.*

*13. The apparatus as defined by claim 12 wherein said first and second isolating means are each loop forming means respectively disposed between said payout reel and said take up reel, and said exposure station, and further including second drive means for paying out and taking up film by said payout and take up reels, respectively.*

*14. The apparatus as defined by claim 13 wherein said first drive means incrementally moves said defined portion of film in the longitudinal direction from said first loop forming means to said second loop forming means.*

*15. The apparatus as defined by claim 13 wherein said first drive means incrementally moves said defined portion of film in a direction transverse to the direction of film movement from said first loop forming means to said second loop forming means.*

*16. A method for rapidly exposing selected framelets of a defined portion of film provided from a payout reel fed to a take up reel past an exposure station, comprising:*

*(a) moving said defined portion of film from said payout reel to said exposure station,*

*(b) isolating said defined film portion from said payout and take up reels so that movement of said defined portion with respect to said exposure station will not result in either the paying out or taking up of film by said payout and take up reels during said movement,*

*(c) incrementally moving said isolated defined film portion with respect to a fixed exposure means disposed at said exposure station to selectively expose said selected framelets, and*

*(d) thereafter moving said exposed defined portion of film to said take up reel.*

*17. The method as defined by claim 16 wherein said isolation is effected by loop formation adjacent said exposure station.*

*18. The method as defined by claim 17 wherein said incremental movement is effective to expose said framelets in longitudinal and transverse directions.*

References Cited

The following references, cited by the Examiner, are of record in the patented file of this patent or the original patent.

UNITED STATES PATENTS

| | | | |
|---|---|---|---|
| 2,803,991 | 8/1957 | Wagner | 355—53 |
| 2,881,658 | 4/1959 | Bornemann | 355—54 |
| 3,234,849 | 2/1966 | Back | 355—54 |
| 3,502,411 | 3/1970 | Wells | 355—54 |
| 3,183,771 | 3/1965 | Rutrus | 353—27 |

SAMUEL S. MATTHEWS, Primary Examiner

R. A. WINTERCORN, Assistant Examiner

U.S. Cl. X.R.

95—12; 353—27; 355—74, 77